SHIGEYOSHI KATO
INVENTOR
BY Wenderoth, Lind & Ponack.
ATTORNEYS

Oct. 21, 1969 SHIGEYOSHI KATO 3,473,732

CALCULATOR

Filed Jan. 12, 1968 4 Sheets-Sheet 2

SHIGEYOSHI KATO

INVENTOR

BY Wenderoth, Lind & Ponack.

ATTORNEYS

SHIGEYOSHI KATO,

INVENTOR

BY Wenderoth, Lind & Ponack.

ATTORNEYS

United States Patent Office 3,473,732

Patented Oct. 21, 1969

3,473,732

CALCULATOR

Shigeyoshi Kato, 60 Shinmeicho, Suginami-ku, Tokyo, Japan

Filed Jan. 12, 1968, Ser. No. 697,463
Claims priority, application Japan, Jan. 25, 1967, 42/6,113; June 2, 1967, Ser. No. 42/34,885
Int. Cl. G06c *27/00*
U.S. Cl. 235—79.5 5 Claims

ABSTRACT OF THE DISCLOSURE

The calculator has rotatable endless scaled wheels or endless scaled belts and multiplier indicating mechanism, which is capable of operating on the principle of the conventional slide rules. When a basic figure of a given number settled on a scale under operation travels beyond the reference line of the calculator, the set multiplier is automatically changed. The resultant numerical value and its figure are directly indicated on the calculator.

This invention concerns a portable hand-operated calculator for performing multiplication, division and the like calculations.

Conventionally, there is known a straight slide rule as a sort of calculator which utilizes scales. In this type of the calculator, calculation at a portion beyond the end of the scale is impracticable. On such occasion, the sliding scale of the slide rule must be shifted from one side to the other side for performing the calculation. In order to remove such inconvenience, a disc calculator having endless scales has been proposed. However, there is also a certain difficulty in the disc calculator. Since it is composed of a combination of a large disc and a small disc which are mutually pivoted on a same axis, a curved length between two graduations must be visually divided for accurately reading out the result of the calculation. This work is quite difficult since the linear length is curved and is therefore liable to produce unexpected errors. In addition, the diameters of the discs are maintained within certain limits in view of the handling convenience, even though a larger scale is better for increasing the precision. Moreover, in many types of conventional calculators of this kind, the figure of the calculated value always has to be carried in one's memory. This is very troublesome and may produce a careless mistake. For these reasons, the wide utilization of the known hand-operating calculators has encountered difficulties.

This invention has as an object to improve the above-mentioned various faults encountered in the conventional calculators by providing drums or long belts having endless scales thereon, by arranging straight the portion to be visually divided for reading the value, and by setting precise graduation for reducing the possible errors. The calculator according to this invention can mechanically indicate correct figures, retaining the merit and principle of the slide rules. Anyone can therefore handle it very easily. The utilization of the same is thus considerably broaden.

The invention will be more fully understood by reference to the accompanying drawings, the detailed explanation and the appended claims.

Figure 3A:
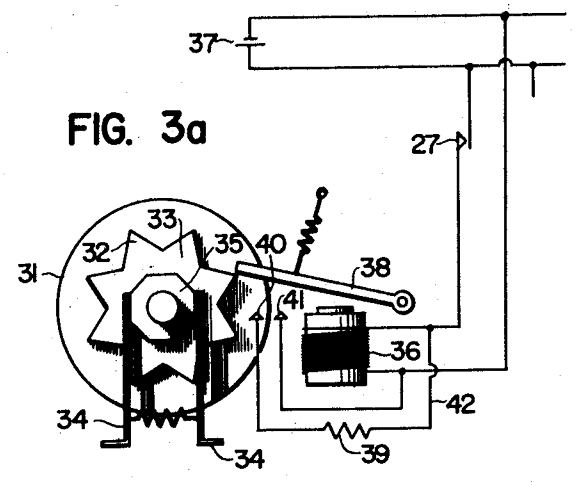
Figure 3B:
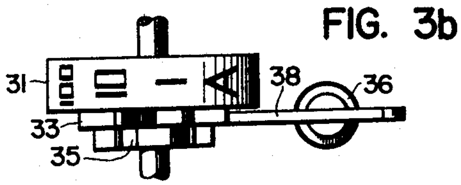

FIGS. 3*a* and 3*b* are explanatory views of a first multiplier indicating mechanism for scale A.

Figure 4A:
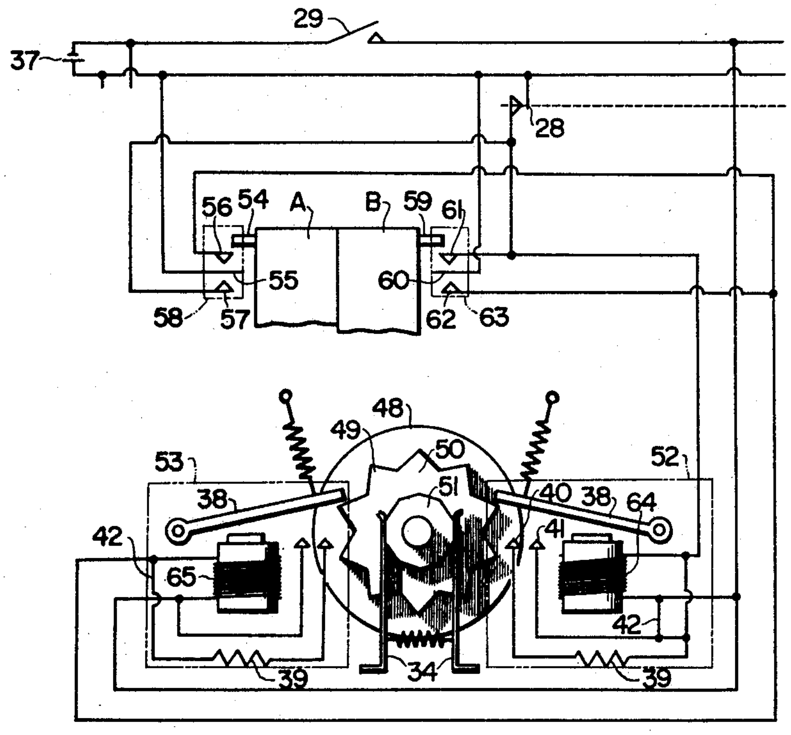
Figure 4B:
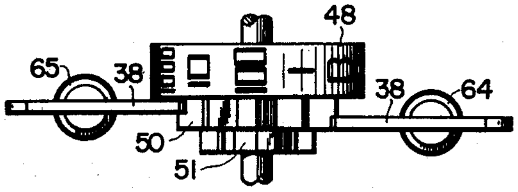

FIG. 4*a* and 4*b* are similar views of second multiplier indicating mechanism for scale B.

Figure 5A:
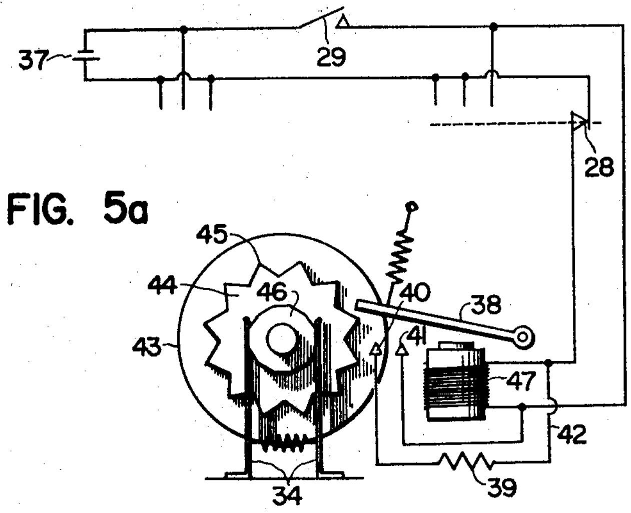
Figure 5B:
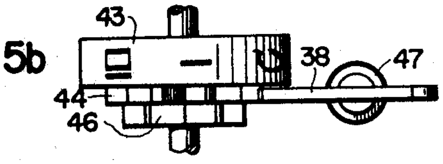

FIGS. 5*a* and 5*b* are similar views for a third multiplier indicating mechanism for scale C.

Figure 6:
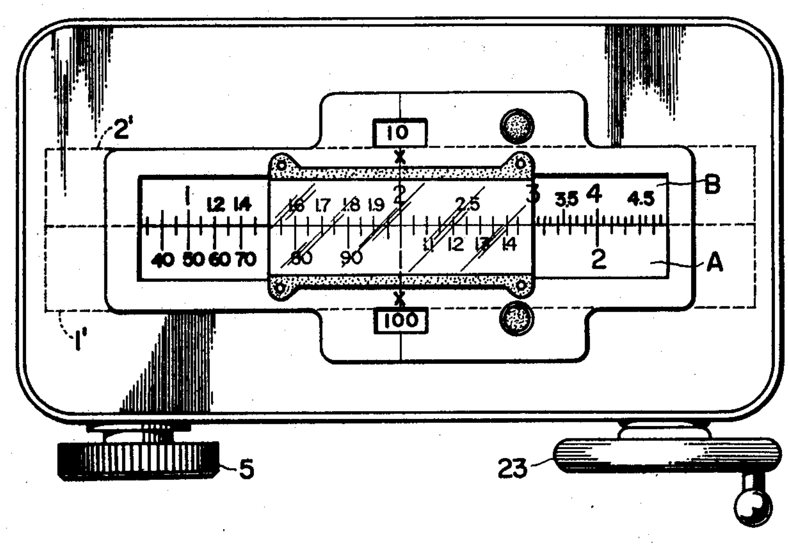

FIG. 6 shows a belt-type modification in which the dials are arranged horizontally.

Figure 1:
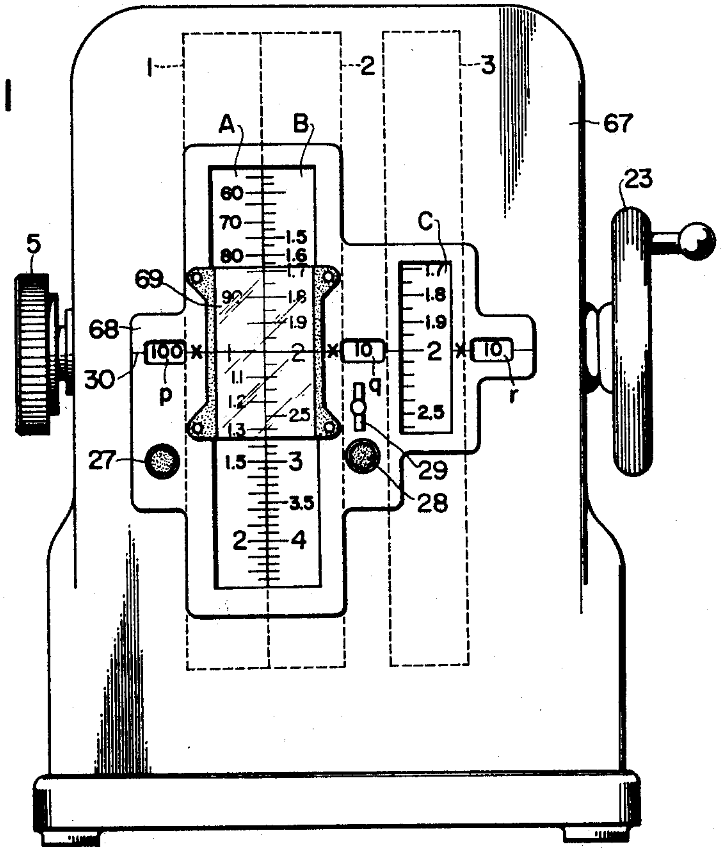
FIG. 1 is a front elevation of the calculator.
Figure 2:
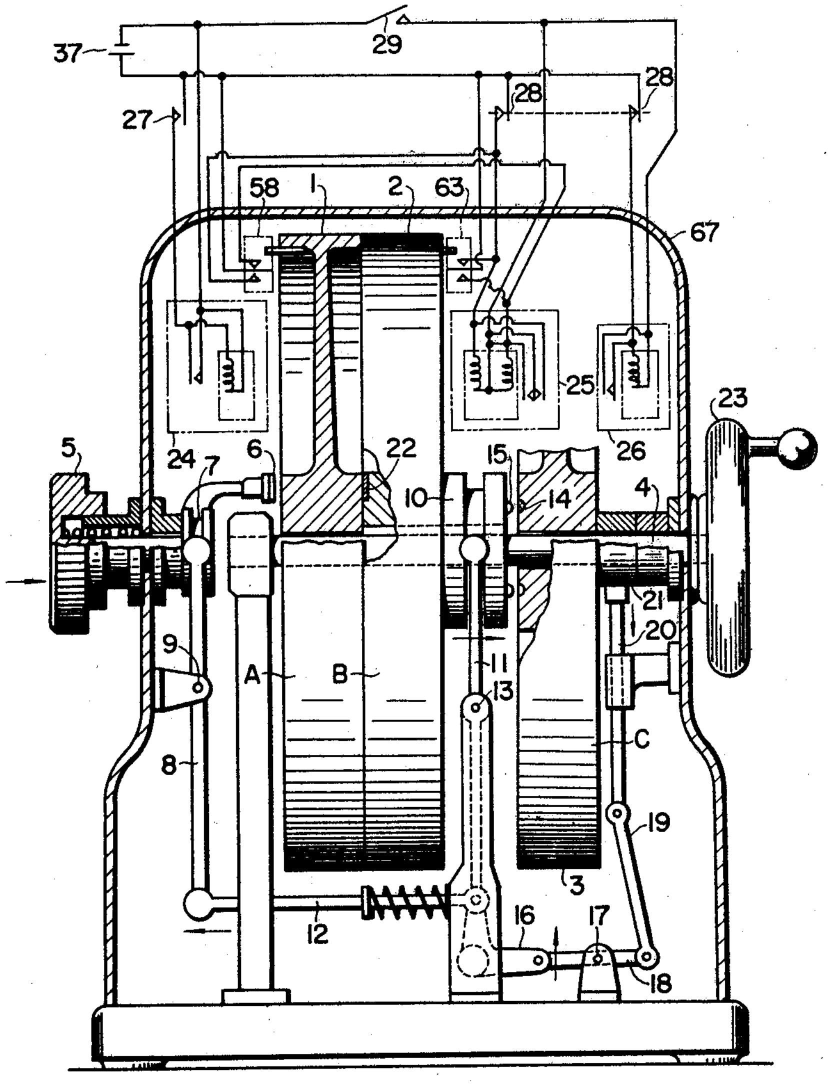
FIG. 2 is a vertical section of the calculator.

In the embodiment shown in FIGURES 1 and 2, the calculator has scale wheels 1, 2 and 3 for scales A, B and C. These scales A, B and C are arranged on the peripheries of the scale wheels to form endless logarithmic slide rule scales. The scale wheels are pivoted on shaft 4 rotably supported at the both ends. Only the scale wheel 2 having the scale B can be rotated as the shaft 4 rotates, and is movable in the direction parallel to the axis of the shaft.

A reference numeral 5 shows a push button having a return spring. When the push button is pushed, a magnetic coupling 6 at the end of the push button is brought in touch by the attraction with the scaled wheel 1, so that the rotation of the scaled wheel 1 is restrained. By the said movement of the push button 5, a rail 7 at the end of the push button actuates a connecting rod 8 to rotate around a pivot 9, since the upper end of the connecting rod is slidably engaged with the rail. Accordingly, a connecting rod 11 slidably engaged with a rail 10 which is fixed to the scaled wheel 2 is rotated through another connecting rod 12 in the clockwise direction around a pivot 13, so as to slide the scaled wheel, 2 which is integral with the rail 10 on the shaft 4 in the direction of the scaled wheel 3. When the scales B and C are entirely aligned with respect to their graduation, recesses 14 provided at the side of the scaled wheel 3 and projections 15 provided at the side of the rail 10 can be fitted to each other, for allowing the transmission of the rotation of the scaled wheel 2 to the wheel 3. Under these conditions, the connecting rod 12 actuates the connecting rod 11, and also lowers a braking rod 20 through an L-shaped connecting rod 16, a connecting rod 18 supported by a pivot 17, and a connecting rod 19. Such lowering of the braking rod 20 results in separation of the upper end of said braking rod 20 from a brake ring 21 which is integral with the scaled wheel 3 and normally urged toward the upper end of the braking rod 20. Thereby the free rotation of the scaled wheel 3 can be assured.

Under the normal condition in which the push button 5 is released, the scaled wheels 1 and 2 are in a close contact by the attraction of a magnetic coupling 22 provided at the side of the scaled wheel 2, for transmitting the rotation of the scaled wheel 2 to the scaled wheel 1. In this condition, the upper end of the braking rod 20 is urged against the brake ring 21 for maintaining the scaled wheel 3 in stationary condition. The rotation of the shaft 4 is then carried out by a handle 23 axially mounted on one end of the shaft 4. On the other hand, the push button 5 is rotated while it is pushed for bringing the magnetic coupling 6 in touch with the scaled wheel 1, thereby performing the fine adjustment of the scaled wheel 1 so as to set the graduation of the scale A in a proper predetermined position.

Now, so-called unit devices or multiplier indicating mechanisms 24, 25 and 26 for indicating the numbers of the figure for the read-out value on each of the scales A, B and C, the relationship between key switches 27 and 28 and power source switch 29, and the variation on the multiplier indicating mechanisms 24, 25 and 26 when an indication 1 of each of the scales A and B passes over a reference line 30 (FIGURE 1), will be explained in detail particularly referring to FIGURES 2, 3, 4 and 5.

The multiplier indicating mechanism 24 which corresponds to the scale A has a so-called unit indicating wheel or a multiplier indicating wheel 31 on which peripheral surface indications, A, 1, 10, 100 . . . are written, a gear-like wheel 33 having teeth 32 of same number as that of the afore-mentioned indications of the multiplier indicating wheel 31, and a rotatable polygonal wheel 35 having angles of same number as that of the afore-mentioned indications and pinched by a pair of spring brushes 34, these members being pivotally mounted on a same shaft. As shown in FIGURE 3*a*, there is provided with an electromagnetic coil 36 in the neighbourhood of the gear-like wheel 33. One end of the electromagnetic coil 36 is connected to a power source 37 through a key switch 27. By closing the key switch 27, the electromagnetic coil 36 is actuated to attract a contactor 38 which is supported at one end and has a resilient returning force. The other free end of the contactor 38 is then brought in touch with a tooth 32 of the gear-like wheel 33 to rotate the wheel 33 a certain degree. The rotation angle is determined by the spring brushes 34 since they help such rotation. Thus the multiplier indicating wheel 31 of the multiplier indicating mechanism 24 is rotated through a predetermined angle. Before the gear-like wheel 33 has completed its rotation, the contactor 38 is brought into contact with terminals 40 and 41 which are connected to the electromagnetic coil 36 through a resistance 39, so as to form a short circuit 42, thereby ending the actuation of the electromagnetic coil 36. Thus the contactor 38 is returned to the original position.

Accordingly, the desired multiplier indication can be selected by closing the key switch an appropriate number of times.

The multiplier indicating mechanism 26 which corresponds to the scale C is constructed in a like manner, as shown in FIGURES 2 and 5. This mechanism 24 however has a multiplier indicating wheel 43 which has an indication C, a space, an indication 1, a space, an indication 10 . . . . A gear-like wheel 44 and a rotatable polygonal wheel 46 having corresponding number of teeth 45 and angles, respectively. This multiplier indicating mechanism 26 also has an electromagnetic coil 47 of which one end is connected to the power source 37 through a key switch and the other end is connected to the other end of the power source 37 through a source switch 29.

By repeatedly closing the key switch 28 an appropriate number of times, the desired multiplier can be selected as in the afore-mentioned mechanism.

As shown is FIGURES 2 and 4 the multiplier indicating mechanism 25 for the scale B has a multiplier indicating wheel 48 the peripheral surface of which carries indications B, 1, 100, 10, 1000 . . ., a gear-like wheel 50 having same number of teeth 49, and a rotatable polygonal wheel 51 having same number of angles, these wheels being pivoted on the same shaft. Also, there is provided two eletcromagnetic mechanisms for the scale B which are the same as that of the afore-mentioned multiplier indicating mechanism 24 for the scale A having the short circuit 42 and the contactor 38. One of the electromagnetic mechanisms is a positive electromagnetic mechanism 52 which acts to rotate the multiplier indicating wheel 48 in an order of B, 1, 100, 10, 1000 . . ., and the other is a negative electromagnetic mechanism 53 for reversely rotating the multiplier indicating wheel 48.

On a side of a scaled wheel 1, there is provided a contact mechanism 58 including a projected rod 54 on wheel 1 which actuates the contactor 55 into contact with either of contacts 56 and 57, when the projecting rod 54 passes by the reference line 30 (FIG. 1). Also, there is provided with a contact mechanism 63 for the scale B, which is composed of a projecting rod 59 on wheel 2, a contactor 60, and contacts 61 and 62. When the graduation 1 of the scale A passes over the reference line 30 in the direction to decrease its graduation value at the reference line 30 (the downward direction in FIG. 1), the extreme end of the projecting rod 54 is brought into contact with the contactor 55 which is then touched to one contact 57, thereby actuates the positive electromagnetic mechanism 52 of the multiplier indicating mechanism 25 for the scale B. This actuation of the positive electromagnetic mechanism 52 is accomplished by a circuit composed of the contactor 55, one contact 57, the power source 37, one end of the electromagnetic coil 64 of the positive electromagnetic mechanism 52, the other end thereof, the power switch 29, and the power source 37.

When the graduation 1 of the scale B passes over the reference line 30 in a direction that the graduation value of the scale B is decreased at the reference line 30, that is the downward direction in FIG. 1, the contactor 60 is brought into contact with one contact 62 by the abutment of the projected rod 59, thereby the negative electromagnetic mechanism 53 of the multiplier indicating mechanism 25 is actuated through a circuit composed of the contactor 60, one contact 62, the power source 37, one end of the eletcromagnetic coil 65 of the negative electromagnetic mechanism 53, the other end thereof, the power switch, and the power source 37.

Contrarily, when the graduation 1 of the scale A or B passes over the reference line 30, a circuit for actuating the negative electromagnetic mechanism 53 is completed by the abutment between the contactor 55 and the other contact 56 for the scale A, or a circuit for the positive electromagnetic mechanism 52 is completed by the abutment between the contactor 60 and the other contact 61.

For enabling the operation of the multiplier indicating mechanism 25 by repeatedly closing the key switch 28, the key switch 28 is connected to the electromagnetic coil 64 of the positive electromagnetic mechanism 52 and to the power source 37, thus completing the multiplier automatic conversion circuit for the multiplier indicating mechanism 25.

Each of the multiplier indicating mechanisms 24, 25 and 26 function as follows:

(1) When the key switch 27 for the scale A is closed for an appropriate number of times, the selected multiplier such as A, 1, 10, 100 . . . appears at the predetermined position.

(2) When the key switch 28 for the scale B is closed for an appropriate number of times, the positive electromagnetic mechanism 52 of the multiplier indicating mechanism 25 for the scale B and the the multiplier indicating mechanism 26 for the scale C are concurrently actuated for indicating letters B and C, or the numbers 1 or 10 (same number for the both mechanisms). The multiplier indicating mechanism 25 for the scale B will indicate 100 next to 1, and 1000 next to 10, while such variation would not take place in the case of the multiplier indicating mechanism 26 for the scale C.

(3) The multiplier appearing on the multiplier indicating mechanism 25 for the scale B is further varied as follows:

When the graduation 1 of the scale A or scale B passes over the reference line 30 in the direction that the graduation is decreased, that is, the downward direction in FIG. 1, the positive electromagnetic mechanism 52 (for the scale A) is actuated, thereby the set indication of multiplier 1 is automatically changed to 100, and 10 to 1000. For the scale B, the negative electromagnetic mechanism 53 is actuated to reset the indication to 1 for the set multiplier 1 which was once changed to 100 by the rotation of the scale A, or to 10 for the set multiplier 10 which was once changed to 1000 by the rotation of the scale A.

Contrarily, when the graduation 1 of the scale B passes over the reference line 30 in the direction that the number is increased, that is the upward direction in FIG. 1, the negative electromagnetic mechanism 53 is actuated to reset the indication of the scale A to 1 for the set multiplier 1 which was once changed to 100 by the rotation of the scale B, or to 10 for the set multiplier 10 which was once changed to 1000 by the rotation of the scale B. For the scale B, the positive electromagnetic mechanism 52 is actuated so that the multiplier is automatically changed from the set number 1 to 100, or from the set number 100 to 1000. However, if the graduation 1 of the scale A is set and then the graduation of the scale B and its multiplier are selected, the multiplier indication for the scale B would not be changed even when the graduation 1 of the scale A passes over the reference line 30 (FIG. 1). This is due to the fact that the projecting rod 54 for the scale A is positioned at the contact 56 side in relation to the conductor 55 of the contact mechanism for the scale A.

It is to be noted that the indicating multiplier $10^n$ of the multiplier indicating wheels 31, 48 and 43 of the multiplier indicating mechanism 24, 25 and 26 is not limited to the above-mentoned values $n=1$, 2 or 3, but there can be selected any desired integers and they can be suitably arranged in proper order. Furthermore, any like multiplier may be adopted as occasion demands.

The multiplier indications which are changed by the multiplier automatic changing mechanism, are different according to the range of graduation given on the scales A, B and C. In the present embodiment, the range of graduation is from 1 to 100 (logarithmic graduation), and the points 1 and 100 are unified by connecting both ends of the scale to form an endless scale. Therefore, the changing point means the reference values 1 and also 100. For these reasons, when the indicated graduation is over the changing point, the number of figure changes to $10^2$. Accordingly, the indicated multiplier which can be changed by the multiplier automatic changing mechanism and the indicated multiplier set by the key switch 28 have the relation of $10^2$ with each other. In general it can be said that if the difference in figure between both ends of the scale is $m$, the indicated multiplier to be changed by the multiplier automatic changing mechanism and that set by the key switch 28 must have the relation of $10^m$.

In the drawings, the reference numerals 67, 68 and 69 show a casing, a window frame and a glass window, respectively.

Now, some calculation examples will be explained in detail referring to the manipulation of the calculator.

In a case of reading the price of a certain material of 750 gr. of which price for 100 gr. is 20 yen, the process of calculation is carried out as follows:

(1) Set the multiplier p for the scale A is set to 100 by actuating the key switch 27 for the necessary number of times, and also the multipliers $q$ and $r$ for the scales B and C, respectively, are set to 10 by actuating the key switch 28 for the necessary number of times.

(2) Turn the handle 23 to set the graduation $a=1$ of the scale A on the reference line. In such a condition, the reading of the scale A is $$a\times p=1\times 100=100 \text{ gr.}$$

(3) Next, turn the handle 23 while pushing the button 5, the scale B is separated from the scale A which has its graduation $a=1$ fixed at the reference line 30, and separately rotated. When the projection 15 provided on the side of the rail 10 fixed to the scale wheel 2 is fitted to the recess 14 provided on the side surface of the scaled wheel 3, in other words, when the graduation of the scale B is aligned to that of the scale C, the graduation $b=2$ of the scale B is brought to the reference line 30. In this condition, the graduation $c=2$ of the scale C is naturally aligned with the reference line 30 since the scale C is concurrently rotated in accordance with the rotation of the scale B. Since the multipliers $q$ and $r$ are already set as 10, the reading value of the scales B and C are $$b\times q=c\times r=2\times 10=20 \text{ yen}$$

(4) In this condition the graduation $a=1$ of the scale A, the graduation $b=2$ of the scale B and the graduation $c=2$ of the scale C are aligned on the reference line 30.

(5) When the push button 5 is released, the scale C indicates on the reference line 30 the graduation $c=2$ and the multiplier $r=10$. In order words, the scale C is stopped in the state that it indicates the price of 20 yen.

The scales A and B simultaneously start to rotate by turning the handle 23.

(6) Further turning the handle 23, the graduation $a'=7.5$ of the scale A is set of the reference line 30. In such condition, the graduation $b$ of the scale B on the reference line shows 15, and the multiplier $q'$ therefore shows 10. Namely, the reading of the scale A is $$a'\times p=7.5\times 100=750 \text{ gr.}$$

Then the reading of the scale B is $$b'\times q'=15\times 10=150 \text{ yen}$$

(7) The scale C still shows the price of 20 yen for 100 gr.

(8) In general, the price for total grams at the same unit price can be read from a graduation $b''$ of the scale B on the reference line 30 when the graduation $a''$ of the scale A is set to the gram value on the reference line 30. Also, the gram value for total prices at the same unit price can be read from the graduation $a'$ of the scale A on the reference line 30 when the graduation $b'$ of the scale B is set to the price on the reference line 30. The figures for the set value and the read-out value amount to the multiplier $p$ and $q'$ which correspond to the respective scale.

Next, the general operation for multiplication will be explained hereunder:

(1) Set the graduation $a=1$ of the scale A on the reference line 30 by turning the handle 23.

(2) Then, turn the handle 23 while pushing the push button 5, for rotating the scale B and for aligning the graduations of the scales B and C with each other. Further rotating the handle 23 to set the graduation $b=$ (the number to be multiplied/$q$) of the scale B on the reference line 30. The multiplier $q$ for the scale B is indicated by pressing the key switch 28. Thereafter release the push button 5.

Under the circumstances, the graduation $c$ of the scale C will stop when it indicates a value the same as the graduation $b$ of the scale B. The scales A and B are therefore in a state that they will be rotated together.

(3) Then, set the graduation $a'=$(multiplying value/$p$) of the scale A on the reference line 30. Also, indicate the multiplier $p$ for the scale A by pressing the key switch 27. The graduation $b'$ of the scale B, the multiplier $q'$ therefor and the multiplier $p$ for the scale A are read.

(4) The answer is given as $$b'\times(p\times q')$$

and a relation $$(a'\times p)\times(c\times r)=(b'\times p\times q')$$

is shown on the reference line 30.

Finally, the general operation for the division will be explained hereunder:

(1) First, set the graduation $a=$(value to be divided/$p$) of the scale on the reference line 30 by turning the handle 23, and set the multiplier $p$ for the scale A by pressing the key switch 27.

(2) Next, align the graduations of the scales B and C by turning the handle 23 while pushing the push button 5. Continue to rotate the handle 23 to set the graduation $b=$(dividing value /$q$), and then release the button 5. Then set the multiplier $q$ for the scale B and the multiplier $r$ for the scale C by operating the key switch 28.

(3) Thereafter turn the handle 23. The scales A and B will be rotated together while the graduation $c$ for the scale C remains stopped showing the value (dividing value/q). By aligning the graduation $b'=1$ on the scale B to the reference line 30, the answer $a'\times p/q$ will be given by reading the graduation $a'$ on the scale A and the multiplier $p/q$.

(4) Thus, the relation:

$$(a'\times p/q)\times(c\times r)=\text{value to be divided}$$

will be established on the reference line 30.

For caution's sake, some examples of a calculation by this modification will be explained as follows:

(a) Calculation for 60×15, for instance, is effected by:

(1) Rotating the handle 23 the graduation 1 on the scale A is brought onto reference line.

(2) Rotating the handle 23 while pushing the push button 5, the graduation 1.5 or 15 on the scale B is brought onto the reference line while the graduation 1 of the scale A is on the reference line. Thus, the graduation 1 of the scale A and the graduation 1.5 or 15 of the scale B are on the reference line.

(3) Next, rotating the handle 23 with the push button 5 released, the scales A and B are concurrently rotated for bringing the graduation 6 or 60 of the scale A onto the reference line. The product 900 can thus be read at the graduation of the scale B on the reference line. The above-mentioned reading procedure is quite the same as that of the conventional slide rule.

(b) Calculation for 60÷15, for instance, is performed as follows:

(1) Turning the handle 23, the graduation 6 or 60 on the scale A is put on the reference line.

(2) Also, turning the handle 23 while pushing the button 5, the scale B is independently rotated so as to align the graduation 1.5 or 15 of the scale B with the reference line. So doing, the graduation 6 or 60 of the scale A and the graduation of 1.5 or 15 of the scale B are brought onto the reference line.

(3) Next, the scales A and B are concurrently rotated by releasing the push button 5, for bringing the graduation 1 of the scale B onto the reference line. The required answer 4 thus appears on the scale A.

In the above embodiment, cylindrical scaled wheels are utilized as carriers for scales. However, the invention is applicable to a calculator having rotatable endless belts as the carriers for the scales, as shown in FIG. 6. In such case, the endless belts can be mounted on two or more shafts or pulleys. Likewise, other modifications can be adopted according to various requirements of the use. Moreover, instead of applying a multiplier automatic changing mechanism to the multiplier indicating mechanism 25 for the scale B, a similar automatic changing mechanism can be applied to the mechanism 24 for the scale A.

In FIG. 6, the belts 1' and 2' are supported by two shafts, one of which carries the push button 5 and the other the handle 23. The shafts are arranged in parallel with each other. In this modification, scale C is omitted for simplifying the construction. However, the manipulation and calculation procedures are substantially same as those of the former embodiments.

It is to be noted that the length of the belts can be increased within a limited space of the casing, if a plurality of the guide rollers are provided for supporting the belts in a serpentine shape. Thus, the scales can be made more precise, and the apparatus can be made more compact.

As specifically explained in the above, the present invention has the following various features:

There are provided a first scale having an endless graduation and driven by a rotational force, and a second scale which can be selectively stopped irrespective of the first scale and also can cooperate with the first scale.

Both scales have a multiplier indicating mechanism, one of which is made as an automatic changing mechanism for automatically changing the indicated multiplier by $10^m$ when the graduation 1 or the like graduation of the scale passes over the reference line. In these multiplier indicating mechanisms for each scale, any desired multiplier can be set. When the multiplier is given $10^n$ ($n$ being any desired integer) or a letter, the set figure can be shown in the relation between the multiplier and the graduation of the scale.

In general, when the graduation 1 or the like reference graduation of the scale passes over the reference line, the figure of the calculation result will be different according to whether the indicated graduation has been travelled over the graduation changing point or not. According to this invention, such trouble can be avoided by the presence of the multiple automatic changing mechanism mounted on one of the scales, since it influences the one multiple indicating mechanism when the graduation 1 or the like reference value of each scale passes over the reference line for indicating the altered multiplier which is multiplied or divided by $10^m$.

Accordingly, the calculator of this invention, which fully utilizes the principle and merits of the conventional slide rules or disc calculators, can mechanically show the scale values and even their multipliers, without necessitating any skill in operation. Therefore, the calculator can be easily used by anyone and the range of utilization thereof is very wide.

What I claim is:

1. A calculator comprising a first member having an endless scale thereon and which is rotatably movable, a second member having an endless scale thereon and which is rotatably movable around the axis of rotation of said first member, said first and second members being arranged in side by side relationship, a reference line indicator having a reference line thereon extending across said scales associated with said members, a multiplier indicating mechanism associated with each member, and an automatic changing mechanism coupled between each member and the respective multiplier indicating mechanism for changing the multiplier indicating mechanism to indicate a changed multiplier when a reference graduation on the respective member passes the reference line on said reference line indicator.

2. A calculator as claimed in claim 1 wherein each of said members is a drum having the endless scale on the outer periphery thereof.

3. A calculator as claimed in claim 1 wherein each of said members is an endless belt having the endless scale on the outer periphery thereof.

4. A calculator as claimed in claim 3 in which said members further include two shafts for supporting each belt.

5. A calculator as claimed in claim 1 further comprising a third member rotatably mounted in side by side relationship to said second member and having a third endless scale thereon and a third multiplier indicating mechanism associated with said third member.

References Cited

UNITED STATES PATENTS

| | | | |
|---|---|---|---|
| 2,259,786 | 10/1941 | Sutton | 235—79.5 |
| 2,289,257 | 7/1942 | Fiala | 235—79.5 |
| 2,439,025 | 4/1948 | Sammons | 235—71 |
| 2,454,987 | 11/1948 | Bradner | 235—71 |
| 2,528,010 | 10/1950 | Lothman | 235—71 |
| 3,129,881 | 4/1964 | Wasserman | 235—79.5 |

RICHARD B. WILKINSON, Primary Examiner

S. A. WAL, Assistant Examiner

U.S. Cl. X.R.

235—71